(12) United States Patent
Tamaoki et al.

(10) Patent No.: US 9,083,163 B2
(45) Date of Patent: Jul. 14, 2015

(54) INLET BOX MOUNTING STRUCTURE OF CAR

(75) Inventors: Teruaki Tamaoki, Kariya (JP);
Yasuhiro Matsuda, Kariya (JP);
Hiroshige Ikuta, Toyota (JP)

(73) Assignees: Toyota Shatai Kabushiki Kaisha,
Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/808,560

(22) PCT Filed: May 9, 2012

(86) PCT No.: PCT/JP2012/061873
§ 371 (c)(1),
(2), (4) Date: Mar. 22, 2013

(87) PCT Pub. No.: WO2012/157489
PCT Pub. Date: Nov. 22, 2012

(65) Prior Publication Data
US 2014/0060920 A1    Mar. 6, 2014

(30) Foreign Application Priority Data

May 16, 2011  (JP) .................. 2011-109342

(51) Int. Cl.
*B60K 15/04* (2006.01)
*H02G 3/08* (2006.01)
*B60J 5/00* (2006.01)
*E06B 7/00* (2006.01)
(Continued)

(52) U.S. Cl.
CPC ... *H02G 3/08* (2013.01); *B60J 5/00* (2013.01); *B60K 15/05* (2013.01); *E06B 7/00* (2013.01); *B60K 1/04* (2013.01); *B60K 2015/0458* (2013.01); *B60K 2015/053* (2013.01); *B60K 2015/0507* (2013.01); *B60K 2015/0553* (2013.01)

(58) Field of Classification Search
CPC ........... B60K 2015/0474; B60K 15/05; B60K 15/04; E05B 83/34; H02G 3/08
USPC ............................. 296/97.22, 208, 1.05, 1.06
See application file for complete search history.

(56) References Cited

U.S. PATENT DOCUMENTS 5,090,760 A * 2/1992 Wheeler .................. 296/1.06
5,906,406 A * 5/1999 Pajakowski ............. 296/97.22
7,740,301 B2 * 6/2010 Hirano ..................... 296/97.22
(Continued)

FOREIGN PATENT DOCUMENTS

DE    101 57 395 A1    6/2003
DE    203 05 291 U1    7/2003
(Continued)

*Primary Examiner* — Jason S Morrow
*Assistant Examiner* — E Turner Hicks
(74) *Attorney, Agent, or Firm* — Christensen Fonder P.A.

(57) ABSTRACT

A mounting structure of an inlet box of a car which includes an outer panel of the car having a hole, an inlet box inserted in the hole, a flange provided around the opening of the inlet box and an engaging claw provided on the outer peripheral surface of the inlet box. The flange is set around the hole from the outside onto the edge. The flange is screwed to the edge of the hole of the outer panel from the inside. The engaging claw engages the hole of the edge of the outer panel from the inside when the flange is set on the edge of the hole. The engaging claw is capable of disengaging from the edge of the hole by a disengagement operation occurring inside the outer panel.

16 Claims, 10 Drawing Sheets

(51) Int. Cl.
*B60K 15/05* (2006.01)
*B60K 1/04* (2006.01)

(56) References Cited

U.S. PATENT DOCUMENTS

2006/0163902 A1    7/2006  Engel
2010/0328057 A1*  12/2010  Liu ............................... 340/438

FOREIGN PATENT DOCUMENTS

| DE | 10 2008 047 464 | A1 |   | 4/2010  |             |
|----|-----------------|----|---|---------|-------------|
| EP | 2 168 804       | A1 |   | 3/2010  |             |
| EP | 2168804         | A1 | * | 3/2010  | ..... B60K 15/05 |
| EP | 2 174 815       | A1 |   | 4/2010  |             |
| EP | 2174815         | A1 | * | 4/2010  | ..... B60K 6/365 |
| JP | 57-165514       | U  |   | 10/1982 |             |
| JP | 58-139328       | U  |   | 9/1983  |             |
| JP | 5-028731        | U  |   | 4/1993  |             |
| JP | 06-013924       | U  |   | 2/1994  |             |
| JP | 06-071246       | U  |   | 10/1994 |             |
| JP | 11-034674       | A  |   | 2/1999  |             |
| JP | 2005-125949     | A  |   | 5/2005  |             |
| JP | 2010-203208     | A  |   | 9/2010  |             |
| JP | 2010-280243     | A  |   | 12/2010 |             |
| KR | 10-2008-0043028 | A  |   | 5/2008  |             |

* cited by examiner

INLET BOX MOUNTING STRUCTURE OF CAR

PRIORITY CLAIM

The present application is a National Phase entry of PCT Application No. PCT/JP2011/061873, filed May 9, 2012, which claims priority from Japanese Patent Application No. 2011-109342, filed May 16, 2011, the disclosures of which are hereby incorporated by reference herein in their entirety.

TECHNICAL FIELD

The present invention relates to inlet box mounting structures for an outer panel of a car.

BACKGROUND ART

Figure 16:
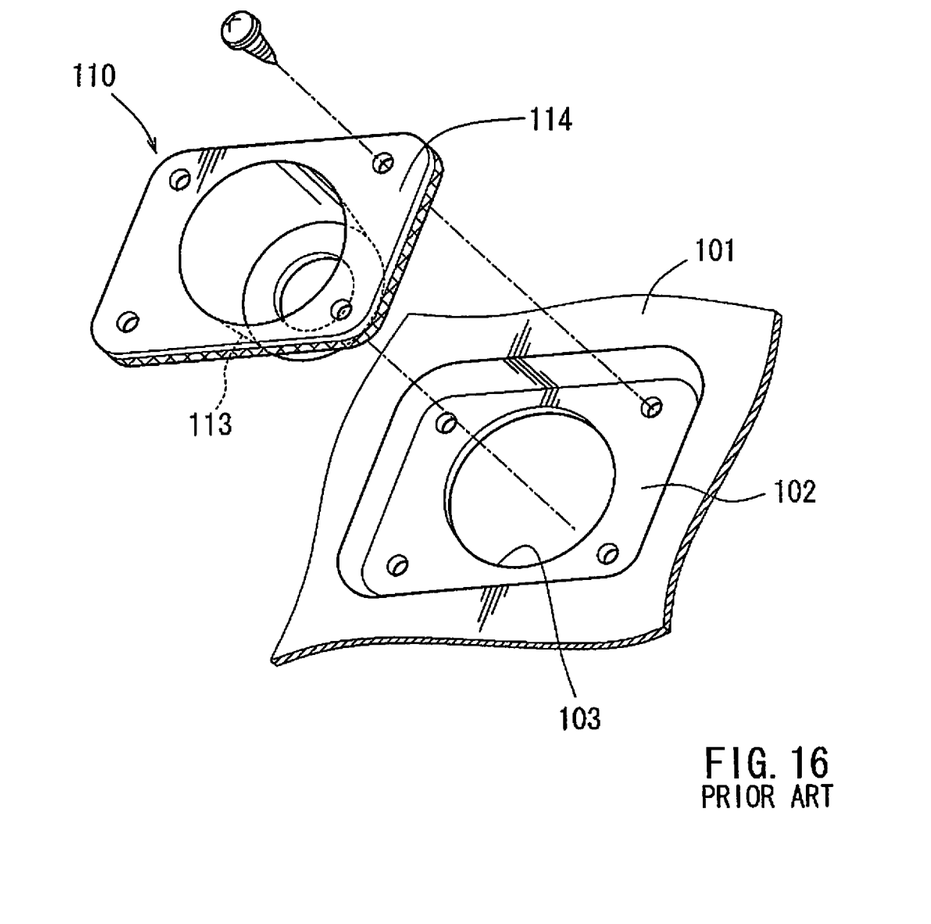
FIG. 16 is a perspective view of a conventional inlet box mounting structure of a car.

Japanese Laid-Out Patent Publication No. 2005-125949 discloses a mounting structure for an inlet box of a car. As shown in FIG. 16, the user first inserts the cylindrical portion 113 of the inlet box 110 into a hole 103 provided in a recess of an outer panel 101 of the car. A flange 114 provided around the opening of the inlet box 110 is then overlapped on the edge 102 around the hole 103 from the outside. Next, the flange 114 of the inlet box 110 is screwed to the edge 102 of the hole 103 from the outside of the outer panel 101. In this way the inlet box 110 is completely installed onto the outer panel 101. A lid (not shown) capable of closing the recess in the outer panel 101 is connected to the outer panel 101 through a hinge mechanism (not shown).

SUMMARY OF THE INVENTION

The flange 114 on the inlet box 110 is screwed to the edge 102 of the hole 103 of the outer panel 101. Thus the inlet box 110 is easy to detach when the lid is opened and makes the inlet box 110 easy to steal. A theft preventative structure is desired. In addition, the head of the screw is visible when the lid is opened, so an improved appearance is also desired.

There is another possible way in which the flange 114 of the inlet box 110 is mounted onto the edge 102 of the hole 103 of the outer panel 101 from the inside. The inlet box 110, in general, is mounted on the side of the outer panel 101. For this reason, if a force should be applied to the inlet box 110 so as to push it outwardly at the time of screwing, the inlet box 110 could possibly fall from the outer panel 101 or shifted from the screwing position. It is thus desired to improve mounting the inlet box 110 from the inside onto the outer panel 101 with screws.

According to one aspect of the present invention, there is provided an inlet box mounting structure for a car which includes an outer panel of the car having a hole, an inlet box inserted in the hole, a flange provided around the opening of the inlet box, and an engaging claw provided on the outer peripheral surface of the inlet box. The flange is set onto the edge of the hole from the outside, and screwed to the edge of the hole of the outer panel from the inside. The engaging claw engages the edge of the hole of the outer panel from the inside when the flange is set on the edge of the hole. The engaging claw is capable of disengaging from the edge of the hole by a disengagement operation inside the outer panel.

This may prevent the inlet box from falling or slipping out of place on the outer panel if a force is applied to press the inlet box outwardly when mounting the inlet box onto the outer panel. This may improve feasibility in mounting the inlet box with screws onto the outer panel. The improved feasibility may lead, for example, to an easier exchange of inlet boxes.

In addition, the engaging claw of the inlet box is configured to disengage from the edge of the hole by a disengagement operation inside the outer panel. Therefore, the engaging claw does not prevent removal of the inlet box when exchanging inlet boxes.

DETAILED DESCRIPTION OF THE INVENTION

Figure 8:
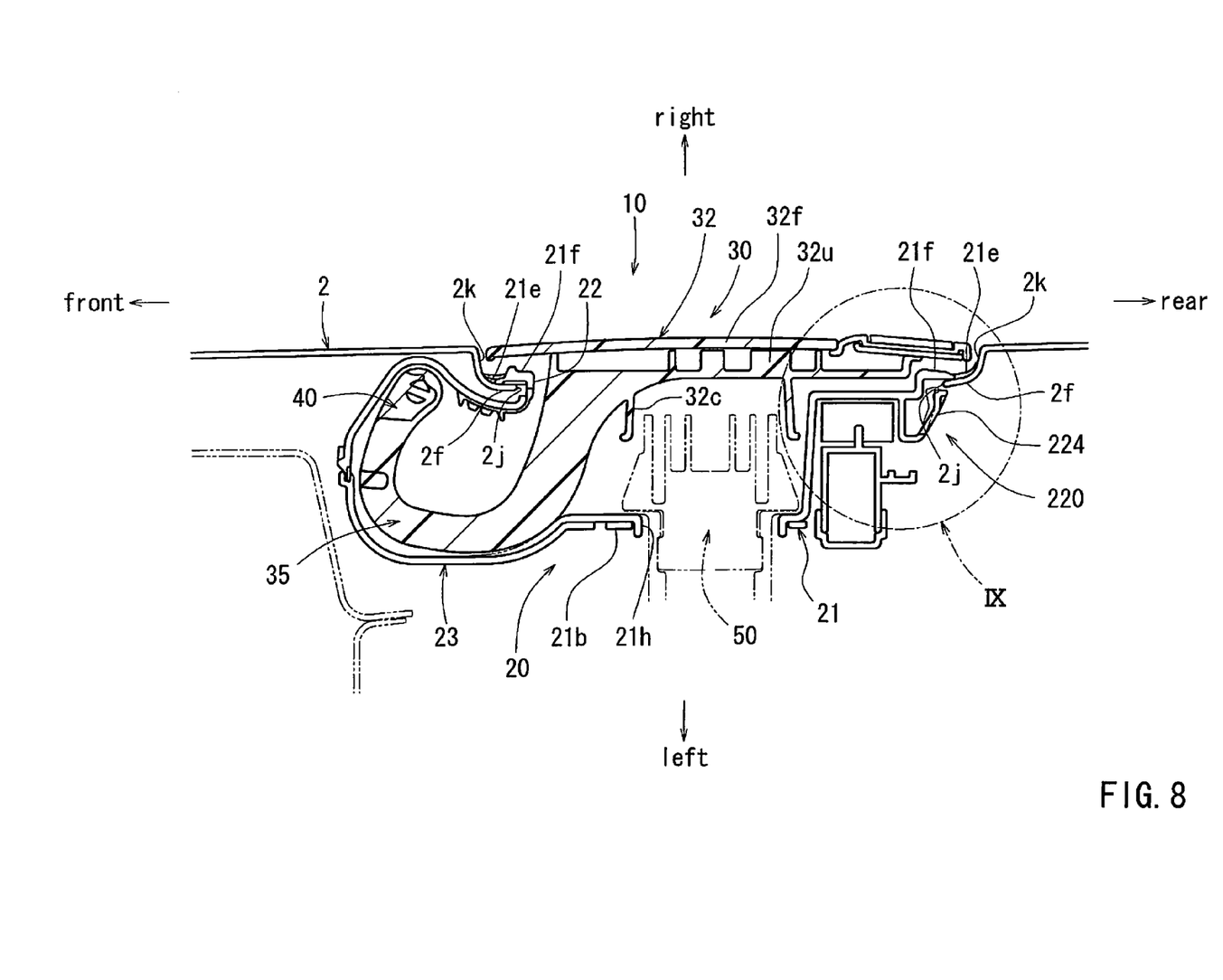
FIG. 8 is a horizontal cross-sectional view of the assembly and the mounting structure of the inlet box.

Described below is an inlet box mounting structure of a car according to one embodiment of the present invention with reference to FIGS. 1 to 13. As shown in FIG. 8, cars equipped with a rechargeable battery (such as electric vehicles (EV), plug-in hybrid electric vehicles (PHEV), etc.) have a charging connector 50 to which a connector of the power supply is connected when charging the battery. The charging connector 50 may be housed in an inlet box 20 made of resin. The inlet box 20 is assembled to be a part of the inlet box assembly 10 (hereinafter simply referred to "assembly") made of resin. As shown in FIGS. 2 and 8, the assembly 10 is provided with a lid 30 made of resin capable of opening and closing the opening 22 of the inlet box 20, and a hinge mechanism 40 rotatably connecting the lid 30 to the inlet box 20. In the following description, front and rear, right and left, and up and down are intended to respectively refer to the longitudinal, lateral, and vertical directions of the car.

Figure 1:
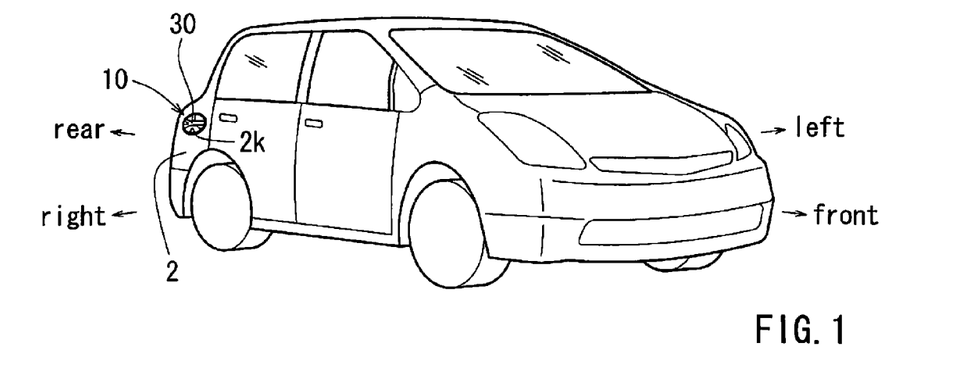
FIG. 1 is a perspective view of a car having an inlet box mounting structure according to one embodiment.
Figure 2:
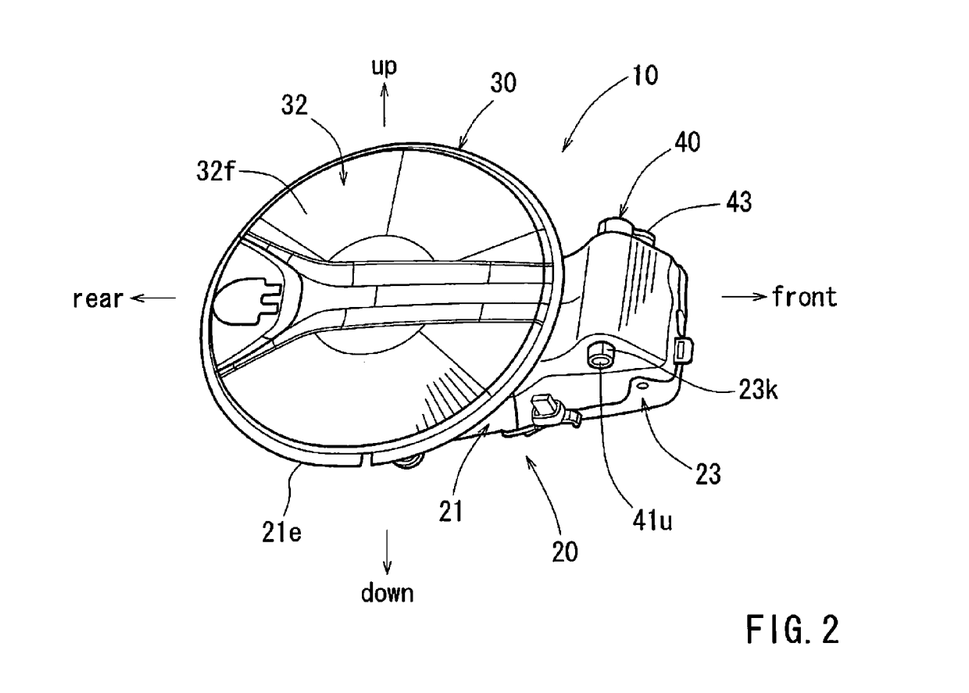
FIG. 2 is a perspective view of the assembly according to the embodiment as viewed from the front.
Figure 3:
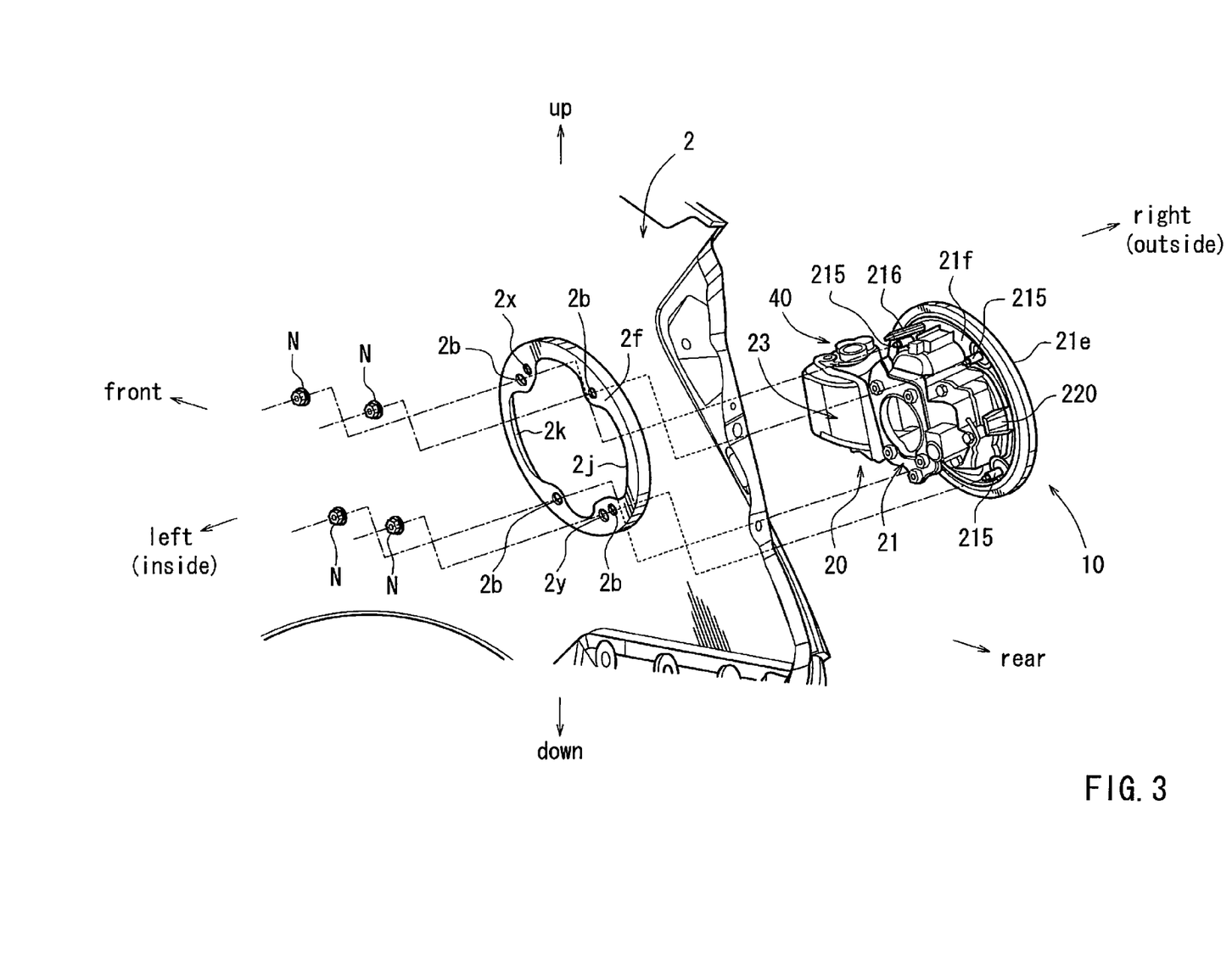
FIG. 3 is a perspective view of the outer panel assembly as viewed from the inside of the car.

As shown in FIGS. 1 and 3, the inlet box 20 is mounted to a certain position on the side surface of the car outer panel 2. In the present embodiment, the inlet box 20 is mounted onto the outer panel on the right side of the car. Therefore, the left of the inlet box 20 is associated with the inside (front side) of the passenger compartment; and the right with the outside (back side).

Figure 4:
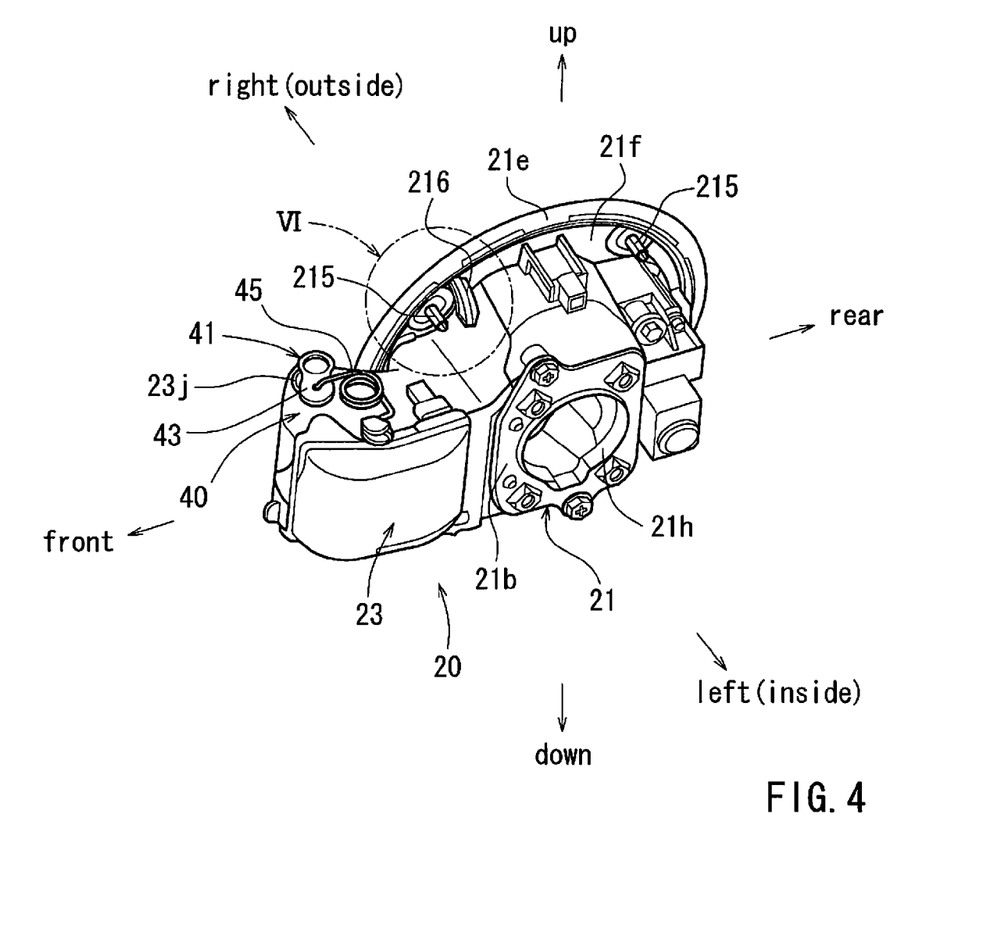
FIG. 4 is a perspective view of the back side of the inlet box as seen from the front above.
Figure 5:
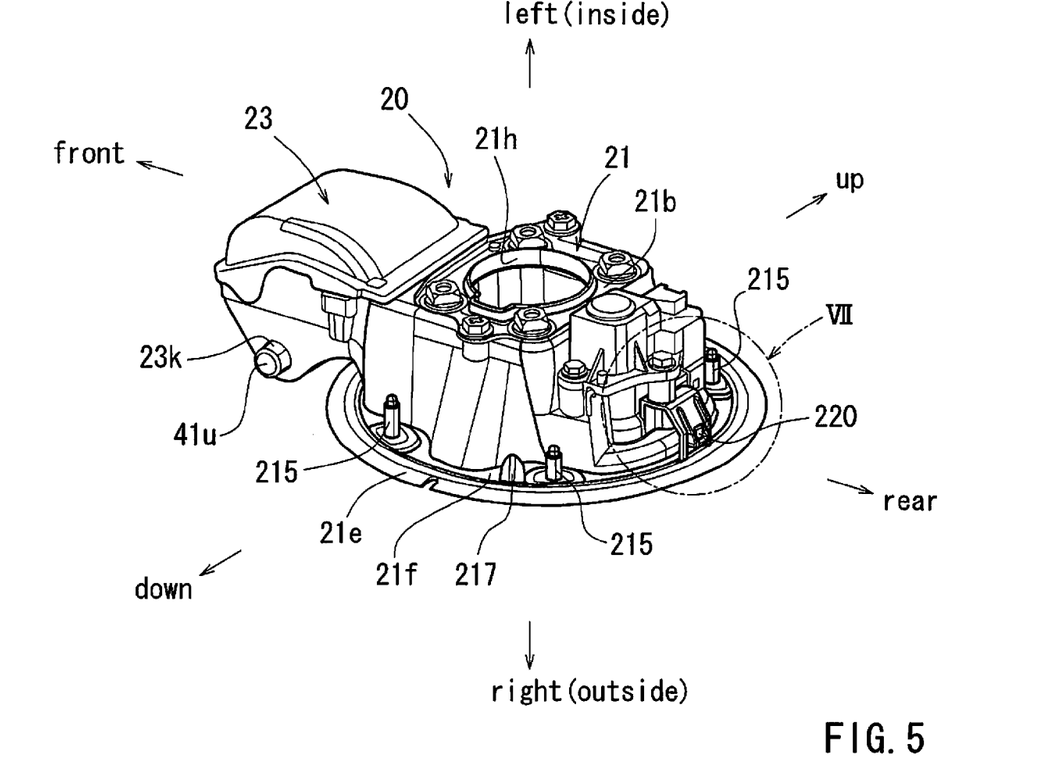
FIG. 5 is a perspective view of the back side of the inlet box as viewed looking up at it from a rear position.

As shown in FIGS. 4, 5 and 8, the inlet box 20 has a box body 21 housing the charging connector 50 (see FIG. 8) and a bulged portion 23 projecting laterally from the box body 21. The box body 21 is formed in a generally cup-shape, which has an opening 22 (see FIG. 8) and a bottom 21b. The bulged portion 23 is a generally angular bag-shape that is open toward the box body 21.

A circular flange 21f is formed around the opening 22 of the box body 21 (see FIGS. 4 and 5). Along the rim of the flange 21f is fixed a seal 21e made of rubber. The bottom 21b of the box body 21 has a bottom opening 21h through which a cable (not shown) is routed. This cable is connected to the charging connector 50.

On the back surface of the flange 21f, as shown in FIGS. 3 to 5, bolts 215 are fixed for mounting inlet box 20 onto the outer panel 2 of the car. The bolts 215 project generally perpendicular to the back surface of the flange 21f. As shown in FIGS. 4 and 5, the bolts 215 are arranged on the flange 21f at intervals of about 90° in the circumferential direction, and two of them are provided for each of the upper and lower portions of the box body 21.

As shown in FIGS. 1 and 3, the outer panel 2 has a circular recess 2k configured to accommodate the lid 30. The bottom of the recess 2k has a generally cross-shaped hole 2j in which the inlet box 20 is to be fitted. As shown in FIG. 3, the edge 2f around the hole 2j of the bottom of the recess 2k has bolt holes 2b through which the respective four bolts 215 on the flange 21f are to be inserted. The four bolts 215 are inserted in the bolt holes 2b and nuts N are screwed on the respective bolts 215 from the inside of the outer panel 215. In this way the inlet box 20 can be mounted to the car.

Figure 6:
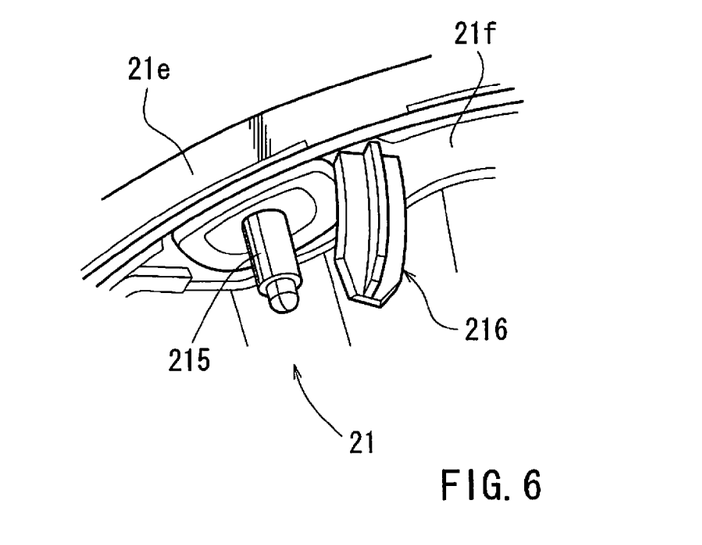
FIG. 6 is an enlarged view of a part of FIG. 4 indicated in the circle VI.

As shown in FIGS. 4 and 6, a positioning pin 216 is fixed on the back side of the flange 21f, at a position in the rear side of the upper front one of the bolts 215. As shown in FIG. 5, on the back side of the flange 21f, an auxiliary positioning pin 217 is fixed in the front of the lower rear one of the bolts 215. The positioning pin 216 and the auxiliary positioning pin 217 are pins for positioning the bolt 215 with respect to the bolt holes 2b.

As shown in FIG. 3, a positioning hole 2x and an auxiliary positioning hole 2y are provided in the edge 2f around the hole 2j of the outer panel 2. The positioning pin 216 and the auxiliary positioning pin 217 (see FIG. 5) are adapted to be passed through the positioning hole 2x and the auxiliary positioning hole 2y, respectively.

The positioning pin 216 is formed of such a length as to be inserted into the positioning hole 2x from the beginning of inserting the inlet box 20 into the hole 2j. As will be described below, the positioning pin 216 is curved along the insertion path of the inlet box 20. The auxiliary positioning pin 217 is inserted into the auxiliary positioning hole 2y at the end of insertion of the inlet box 20, i.e., just before the bolt 215 on the flange 21f is inserted into the bolt holes 2b on the outer panel 2.

Figure 7:
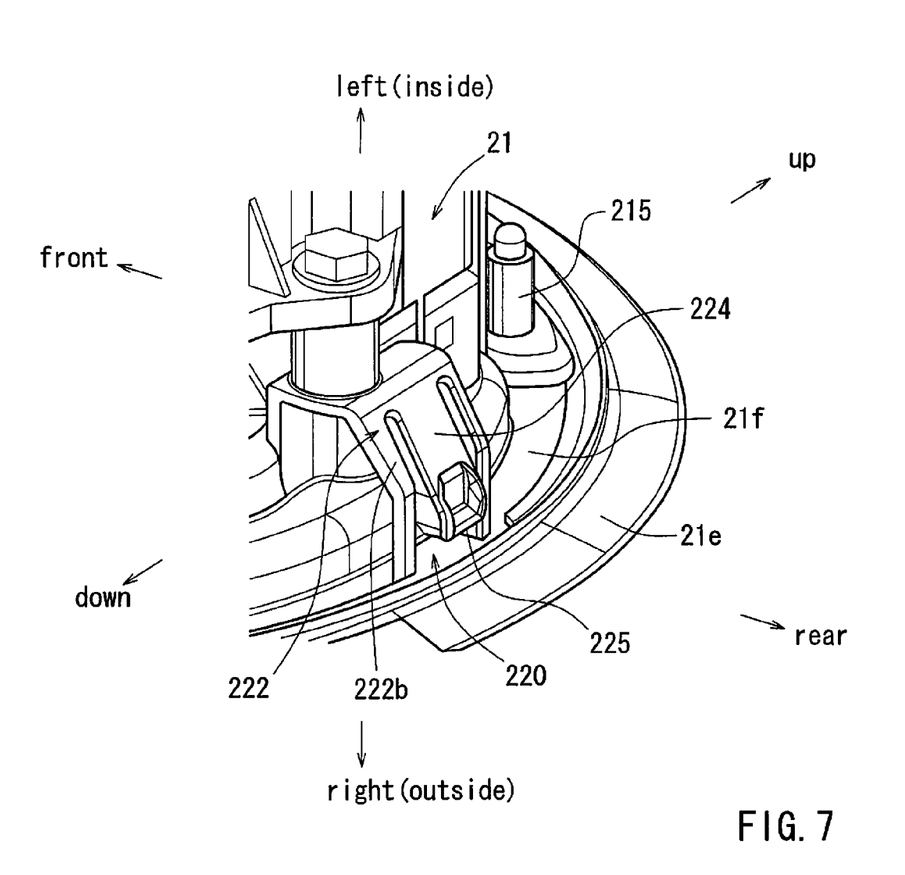
FIG. 7 is an enlarged view of a part of FIG. 5 indicated in the circle VII.

As shown in FIGS. 5 and 7, an engaging claw 220 may be fixed on the rear end of the box body 21. The engaging claw 220 is a claw which prevents the inlet box 20 from falling from the outer panel 2 while the flange 21f is set onto the edge 2f of the hole 2j of the outer panel 2 from the outside. Specifically, the engaging claw 220 can engage the edge 2f of the hole 2j of the outer panel 2 from the inside of the outer panel 2. During such engagement, the bolts 215, the positioning pin 216 and the auxiliary positioning pin 217 of the inlet box 20 are reinserted in the bolt holes 2b, the positioning hole 2x and the auxiliary positioning hole 2y of the outer panel 2, respectively.

Figure 9:
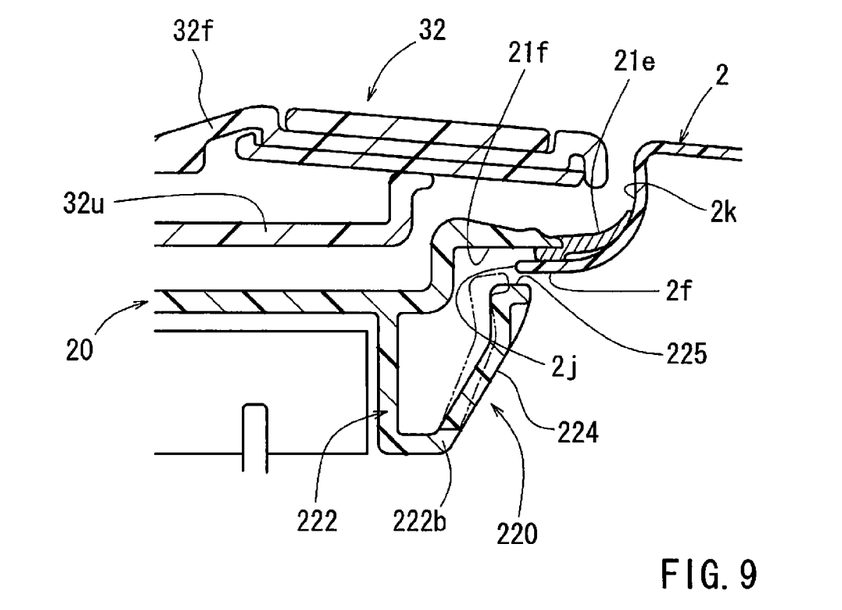
FIG. 9 is an enlarged view of a part of FIG. 8 indicated in the circle IX.

As shown in FIGS. 7 and 9, the engaging claw 220 has a claw body 224 and a claw support 222 (see FIG. 9). The claw support 222 is of an arch shape having a generally U-shaped cross-section. It is open towards the flange 21f and has a rear wall 222b. The claw body 224 is formed by cutting the rear wall 222b whereby a U-shaped slit is formed. This construction allows the claw body 224 to maintain integral construction connection to the top of the arch shape.

As shown in FIG. 9, the claw body 224 is capable of being bent with resin elasticity inwardly and outwardly in the radial direction of the box body 21. The claw body 224 may be supported in the portion near the top of the arch shape of the claw support 222. While the inlet box 20 is inserted into the hole 2j in the outer panel 2, the claw body 224 is deformed in accordance with its elasticity. Deformation can be viewed with reference to the double-chained line. If forced against its retentive properties, it rubs across the edge 2f around the hole 2j. On the distal end of the claw body 224, i.e., the portion farthest from the support, an edge 225 is formed in parallel with the flange 21f. An inner portion of the edge 225 may be configured to engage the edge 2f of the hole 2j from the inside of the outer panel 2. As indicated by the double-chained line in FIG. 9, the claw body 224 can be bent inwardly against its elastic resistance in the radial direction of the box body 21. Through manual operation one can detach the edge 225 engaged with the edge 2f.

As shown in FIGS. 2 and 8, the lid 30 has a disc-shaped lid body 32 capable of closing the opening 22 while being disposed coaxially with the flange 21f. A generally U-shaped lever 35 connects the lid body 32 to the inlet box 20 via a hinge mechanism 40.

The lid body 32 has an outer diameter set generally equal to that of the flange 21f and thus can be housed within the recess 2k of the outer panel 2. As shown in FIG. 8, the lid body 32 is formed of a front plate 32f and a back plate 32u coupled together. A cover 32c of the charging connector 50 is formed at the center of the back plate 32u.

The lever 35 on the lid 30 is rotatably provided about the rotation axis of the hinge mechanism 40. The rotating end of the lever 35 on the lid 30 is connected to the front end of the rear surface plate 32u of the lid body 32. As shown in FIG. 8, the lever 35 on the lid 30 can be accommodated in the bulged portion 23 of the inlet box 20.

Figure 11:
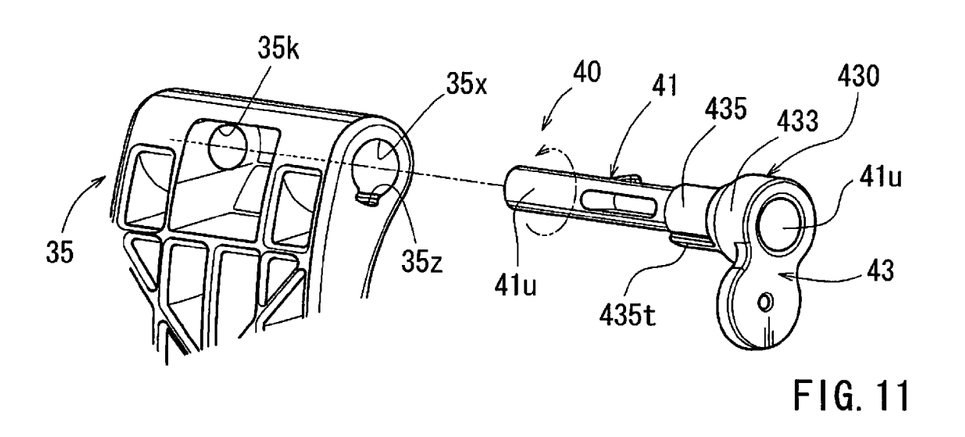
FIG. 11 is a perspective view of the hinge pin of the hinge mechanism and the hinge hole in the lid.

The hinge mechanism 40 is one which connects the lid 30 generally horizontally rotatably to the inlet box 20. As shown in FIG. 11, the hinge mechanism 40 has a hinge pin 41 and a lever 43 provided at the proximal end of the hinge pin 41. The lever 43 is mounted such that it does not rotate with respect to the hinge pin 41. As shown in FIG. 4, the hinge mechanism 40 has a coil spring 45 (biasing member) disposed between the bulged portion 23 of the inlet box 20 and the lever 43.

As shown in FIG. 11, the hinge pin 41 has a pin body 41u and a cylindrical portion 430. The pin body 41u has a proximal end integrated to the cylindrical portion 430. The cylindrical portion 430 is provided with a larger-diameter cylindrical portion 433 located closer to the base end of the pin body 41u and a smaller-diameter detent portion 435 located near the distal end.

As shown in FIGS. 4 and 5, an upper bearing 23j and a lower bearing 23k are fixed on the upper wall and the lower wall, respectively, on the front end of the bulged portion 23 of the inlet box 20, in the outboard position. The larger-diameter cylindrical portion 433 of the hinge pin 41 and the distal end of the pin body 41u are passed through each of the upper bearing 23j and the lower bearing 23k.

The detent portion 435 has a ridge 435t provided on its outer peripheral surface which extends in the axial direction. The ridge 435t is configured to have two side surfaces 435s and 435u (contact surfaces) that are oriented outwardly in the circumferential direction. As viewed in a cross-section shown in FIG. 12, they each extend along a radial line R from the rotation center O of the hinge pin 41. In other words, the ridge 435t has a generally fan-shaped cross-section.

As shown in FIG. 11, the lever 43 is a generally gourd-shaped plate with two discs coupled together. One disc constituting the lever 43 is integrated into the larger-diameter cylindrical portion 433 of the hinge pin 41.

Figure 10:
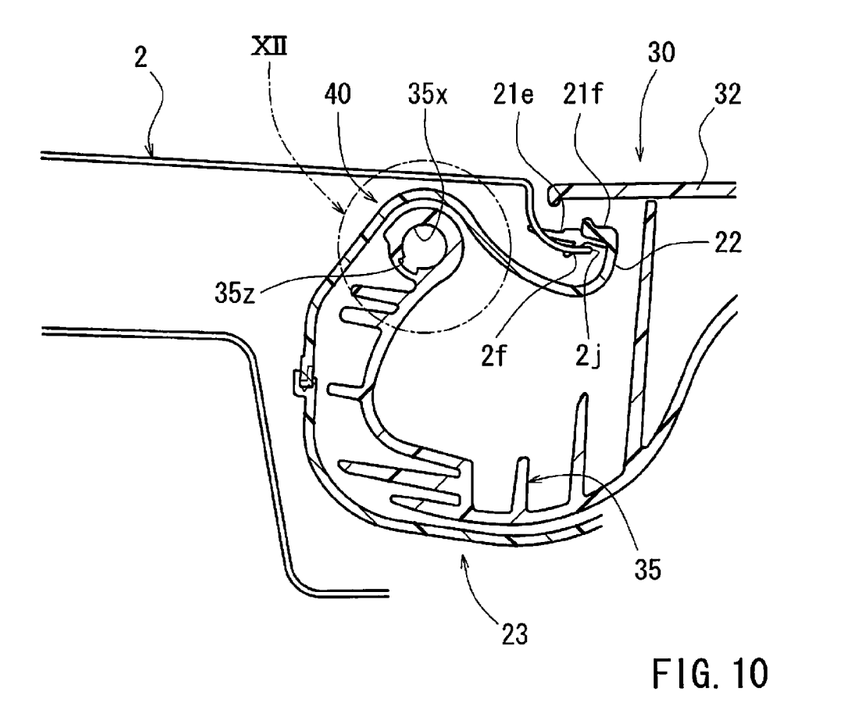
FIG. 10 is a horizontal cross-sectional view of the hinge mechanism connecting the inlet box and the lid.

The lever 35 of the lid portion 30 has a proximal end provided with, as shown in FIGS. 10 and 11, a through hole 35k in which the pin body 41u is fitted, and a detent hole (hinge hole) 35x in which the detent portion 435 is fitted. The detent hole 35x is provided with a groove 35z in which the ridge 435t is fitted in the axial direction.

The groove 35z is configured to have two side surfaces 351 and 352 (contact surface) that face each other in the circumferential direction. As viewed in cross-section shown in FIG. 12, the two side surfaces 351 and 352 each extend in a radial line R from the rotation center O of the hinge pin 41. One side surface 351 of the ridge 435t is in contact with one side surface 435s of the groove 35z, and the other side surface 352 of the ridge 435t is in contact with the other side surface 435u of the groove 35z. In this way, the ridge 435t and the groove 35z have side surfaces in contact with each other's side surfaces, and are thereby engaged together with respect to the circumferential direction. In particular, the side surfaces 435s and 435u of the ridge 435t and the side surfaces 351 and 352 of the groove 35z are provided perpendicular to the direction of the rotation.

As shown in FIG. 4 the coil spring 45 (urging member) is mounted between the lever 43 of the hinge mechanism 40 and the bulged portion 23 of the inlet box 20. The coil spring 45 is capable of imparting rotational force (biasing force) to the lid 30 in a direction to fully open and completely close the opening 22 of the inlet box 20. Since the hinge pin 41 and the lid 30 has the detent by fitting of the ridge 435t and groove 35z, the rotational force by the coil spring 45 is transmitted from the lever 43 and the detent portion 435 of the hinge pin 41, through the ridge 435t and the groove 35z, then to the lid 30.

As shown in FIG. 8, during construction of the assembly, the lever 35 on the lid 30 is first inserted through the opening 22 into the bulged portion 23 of the inlet box 20. Next, the through hole 35k and the detent hole 35x, in the lever 35 of the lid 30, are held coaxially with the lower bearing 23k and the upper bearing 23j. The lower bearing 23k and the upper bearing 23j are provided on the bulged portion 23 of the inlet box 20.

Figure 12:
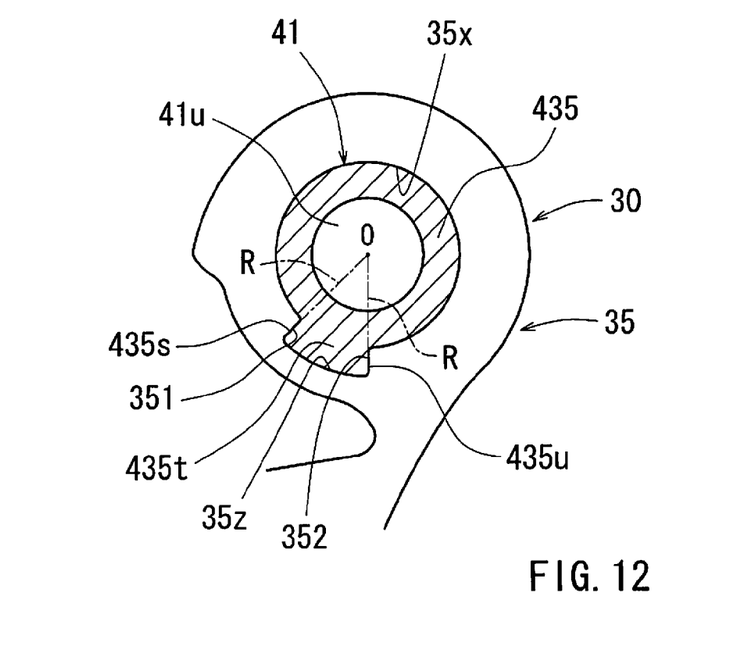
FIG. 12 is an enlarged cross-sectional view of the detent mechanism indicated in the circle XII in FIG. 10.

The hinge pin 41 is then inserted into the inlet box 20 from the side of the upper bearing 23j until the pin body 41u of the hinge pin 41 is fitted in the through hole 35k in the lever 35 on the lid 30. Preferably, as shown in FIG. 5, the hinge pin 41 is fitted into the distal end of the pin body 41u and is held in the lower bearing 23k on the inlet box 20. As shown in FIG. 12, the detent portion 435 of the hinge pin 41 is fitted in the detent hole 35x in the lever 35 of the lid 30. The ridge 435t on the detent portion 435 is fitted in the groove 35z in the detent hole 35x. Further, the larger-diameter cylindrical portion 433 of the hinge pin 41 is held in the upper bearing 23j of the inlet box 20, as shown in FIG. 4. The lever 35 of the lid 30 and the hinge pin 41 thus become capable of rotating in the upper bearing 23j and the lower bearing 23k of the inlet box 20.

Figure 13:
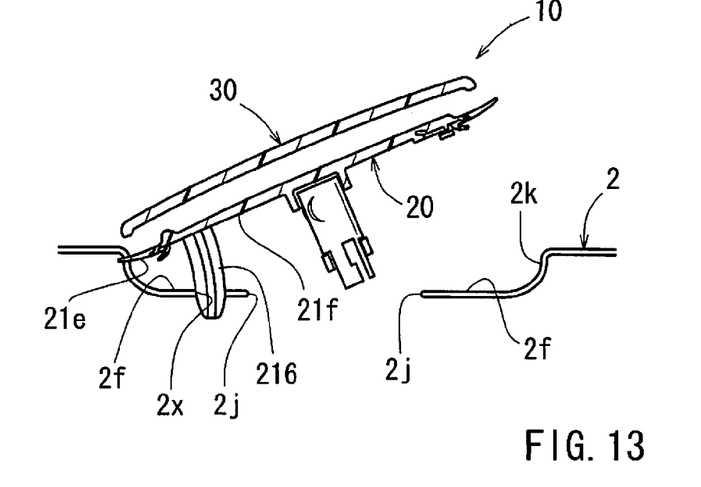
FIG. 13 is a side view of the assembly in the first stage to be set in the outer panel.
Figure 14:
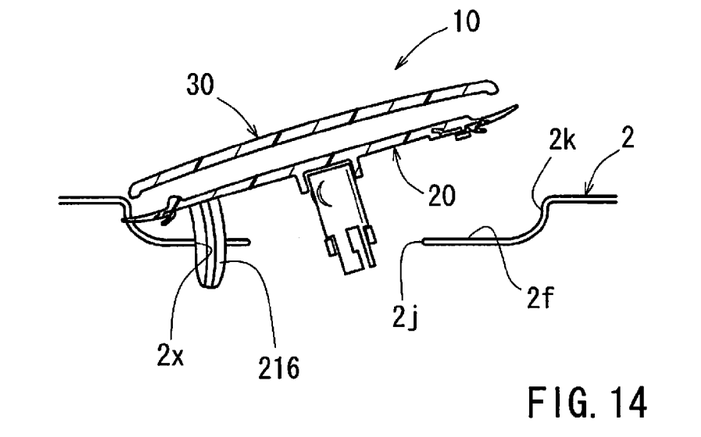
FIG. 14 is a side view of the assembly in the second stage to be set in the outer panel.
Figure 15:
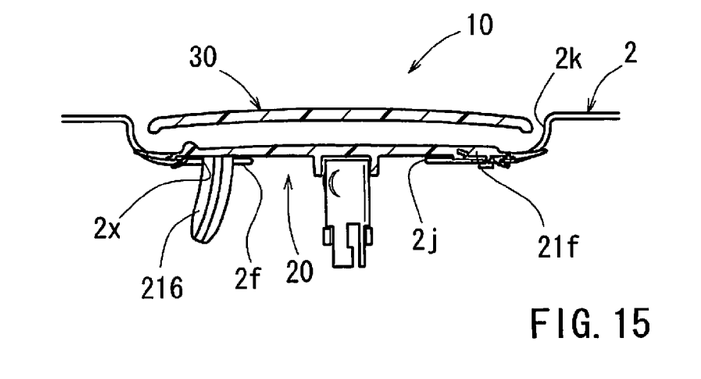
FIG. 15 is a side view of the assembly in the third stage to be set in the outer panel.

In order to mount the assembly 10 onto the outer panel 2, the bulged portion 23 of the inlet box 20 is first inserted into the hole 2j in the outer panel 2 while the assembly 10 is kept tilted. Next, as shown in FIG. 13, the distal end of the positioning pin 216 on the flange 21f of the inlet box 20 is inserted into the positioning hole 2x in the edge 2f of the hole 2j of the outer panel 2. The positioning pin 216 enters the positioning hole 2x while the inlet box 20 goes into the hole 2j in the outer panel 2, as shown in FIG. 14. During this procedure, the auxiliary positioning pin 217 on the flange 21f can be inserted into the auxiliary positioning hole 2y in the outer panel 2 to allow for positioning the bolts 215 on the flange 21f with respect to the bolt holes 2b on the outer panel 2. The bolts 215 on the flange 21f are then inserted into the bolt holes 2b in the edge 2f of the hole 2j. In this way, the flange 21f and the lid body 32 of the lid 30 can be accommodated in a circular recess 2k in the outer panel 2 as shown in FIGS. 8 and 15.

Next, the flange 21f is set on the edge 2f of the hole 2j of the outer panel 2. During this procedure, the claw body 224 of the engaging claw 220 on the inlet box 20 passes through the hole 2j. During this procedure, the claw body 224 tends to rub across the edge of the hole 2j and bend radially inwardly against its own elastic strength (see the two-dot chain line in FIG. 9). When the claw body 224 of the engaging claw 220 has passed through the hole 2j, the edge 225 of the claw body 224 springs radially outward due to its elasticity (see the solid line in FIG. 9) to engage with the edge 2f of the hole 2j from the inside of the outer panel 2.

Next, as shown in FIG. 3, the nut N is screwed from the inside of the outer panel 2 onto each of the bolts 215 on the flange 21f to affix the assembly 10 to the outer panel 2. The edge 225 of the claw body 224 of the inlet box 20 engages with the edge 2f of the hole 2j of the outer panel 2. In this way, even if a force is applied in such a direction as to push the inlet box 20 outward, the inlet box 20 will not fall or slip off the outer panel 2.

As described above, the mounting structure of the inlet box 20 of a car includes: the outer panel 2 of the car having the hole 2j; the inlet box 20 inserted in the hole 2j; the flange 21f provided around the opening 22 of the inlet box 20; and the engaging claw 220 provided on the outer peripheral surface of the inlet box 20. The flange 21f is set onto the edge 2f of the hole 2j from the outside and screwed to the edge 2f of the hole 2j of the outer panel 2 from the inside. The engaging claw 220 engages with the edge 2f of the hole 2j from the inside of the outer panel 2 when the flange 21f is set onto the edge 2f of the hole 2j. The engaging claw 220 is capable of disengaging from the edge 2f of the hole 2j by a disengagement operation inside the outer panel 2.

If a force is applied to the inlet box 20 to press it outwardly, this suppresses the inlet box 20 from falling or slipping off the outer panel 2 when screwed to the outer panel 2 to the inlet box 20. This may improve feasibility in attaching the inlet box 20 to the outer panel 2. The improved feasibility may lead, for example, to an easier exchange of the inlet box 20.

In addition, the engaging claw 220 of the inlet box 20 can be disengaged from the edge 2f of the hole 2j by a disengaging operation inside the outer panel 2. The engaging claw 220 thus does not prevent removal of the inlet box 20 when exchanging the inlet box 20 for another.

In addition, the mounting structure of the inlet box 20 is provided with the positioning hole 2x provided in the edge 2f of the hole 2j of the outer panel 2. It is also provided with a positioning pin 216 provided on the flange 21f on the inlet box 20. The positioning pin 216 is curved along its insertion path where the inlet box 20 is to be inserted into the hole in the outer panel 2. The positioning pin 216 is inserted into the positioning hole 2x.

Inserting the positioning pin 216 in the inlet box 20 into the positioning hole 2x in the outer panel 2 allows an appropriate insertion path along which the inlet box 20 can be inserted into the hole 2j in the outer panel 2. Therefore, the inlet box 20 is easily set onto the outer panel 2 even in the situation where the inlet box 20 has a more complex configuration. In addition, that prevents scratching the surface of the outer panel 2.

In addition, the mounting structure of the inlet box 20 is further provided with the lid 30 to open and close the opening of the inlet box 20. A hinge mechanism connects the lid 30 to the inlet box 20. The hinge mechanism includes: the detent hole (hinge hole) 35x provided on the lid 30; the hinge pin 41 inserted into the detent hole 35x; the ridge 435t and the groove 35z disposed between the detent hole 35x and the hinge pin 41. The ridge 435t and the groove 35z are preferably fitted to each other so as to restrict the relative rotation of the lid 30 and the hinge pin 41; and the coil spring 45 (biasing member) biasing the hinge pin 41 to hold a lid 30 at a certain position. The ridge 435t and the groove 35z includes contact surfaces in contact with each other and perpendicular to the direction of the rotational force applied by the coil spring 45.

Thus, when a rotational force by the coil spring 45 is transmitted from the hinge pin 41 of the hinge mechanism 40 to the lid 30, radial sliding or play does not occur, i.e. the rotational force is efficiently transmitted between the side surfaces 351 and 352 of the groove 35z and the side surfaces 435s and 435u of the ridge 435t. Therefore, less wear will be caused in the fitting portion of the groove 35z and ridge 435t.

In addition, the mounting structure of the inlet box 20 may have a charging connector provided in the inlet box. The charging connector is connected to a power source connector when charging the battery of the car. The mounting structure of the inlet box 20 may thus be applied to automobiles, such as electric vehicles and plug-in hybrid electric vehicles, to achieve the effects stated above.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

Two or more engaging claws 220 may also be provided, and these engaging claws may be arranged, for example, along the circumferential direction of the inlet box 20. There may optionally be provided a plurality of hinge pin 41 and groove (hinge hole) 35z sets in different embodiments. The inlet box may be not only the inlet box 20 with a charging connector 50 but also a fuel inlet box having a fuel supply port.

The invention claimed is:

1. An inlet box mounting structure of a car, comprising:
   an outer panel of a car having a hole;
   an inlet box inserted into the hole along a curved insertion path;
   a flange provided around an opening of the inlet box,
   wherein the flange is set onto an edge of the hole from the outside and screwed to the edge of the hole of the outer panel from the inside;
   an engaging claw provided on an outer peripheral surface of the inlet box,
   wherein the engaging claw engages the edge of the hole of the outer panel from the inside when the flange is set on the edge of the hole, and
   wherein the engaging claw is capable of disengaging from the edge of the hole by a disengagement operation of the outer panel;
   a positioning hole provided on the edge of the hole of the outer panel; and
   a curved positioning pin provided in the flange of the inlet box;
   wherein the positioning pin is curved along the curved insertion path of the inlet box into the hole in the outer panel; further wherein the curved positioning pin is inserted into the positioning hole.

2. An inlet box mounting structure of a car according to claim 1, further comprising:
   a lid to open and close the opening of the inlet box; and
   a hinge mechanism connecting the lid to the inlet box,
   wherein the hinge mechanism comprises:
      a hinge hole provided in the lid;
      a hinge pin inserted in the hinge hole;
      a ridge and a groove provided between the hinge pin and the hinge hole and fitted to each other so as to restrict the relative rotation of the lid and the hinge pin; and
      a biasing member biasing the hinge pin to hold the lid at a certain position;
   wherein the ridge and the groove comprise a contact surface between each other and perpendicular to the direction of the rotational force applied by the biasing member.

3. An inlet box mounting structure of a car according to claim 1,
   wherein a charging connector is provided in the inlet box, which is to be connected to a power source connector when charging the battery of the car.

4. An inlet box mounting structure for a car, comprising:
   an inlet box adapted for insertion along a curved insertion path into a hole of an outer panel of a car, the inlet box defining an opening and having an outer peripheral surface;
   a flange provided around the opening of the inlet box, the flange adapted to be set onto an edge of the hole from the outside;
   an engaging claw provided on the outer peripheral surface of the inlet box, the engaging claw being adapted to engage the edge of the hole of the outer panel from the inside when the flange is set on the edge of the hole, further wherein the engaging claw is capable of disengaging from the edge of the hole; and
   a curved positioning pin provided in the flange of the inlet box, the curved positioning pin being adapted for insertion into a positioning hole provided on the edge of the hole of the outer panel;
   wherein the positioning pin is curved along the curved insertion path of the inlet box into the hole in the outer panel.

5. The inlet box mounting structure of claim 4, wherein the flange is adapted to be fastened to the edge of the hole of the outer panel from the inside.

6. The inlet box mounting structure of claim 4, wherein the engaging claw is capable of disengaging from the edge of the hole by a disengagement operation of the outer panel.

7. The inlet box mounting structure of claim 4, further comprising:
 a lid to open and close the opening of the inlet box; and
 a hinge mechanism connecting the lid to the inlet box,
 wherein the hinge mechanism comprises:
  a hinge hole provided in the lid;
  a hinge pin inserted in the hinge hole;
  a ridge and a groove provided between the hinge pin and the hinge hole and fitted to each other so as to restrict the relative rotation of the lid and the hinge pin; and
  a biasing member biasing the hinge pin to hold the lid at a certain position;
 wherein the ridge and the groove comprise a contact surface between each other and perpendicular to the direction of the rotational force applied by the biasing member.

8. The inlet box mounting structure of claim 4, further comprising a charging connector provided in the inlet box, the charging connector adapted to be connected to a power source connector when charging a battery of the car.

9. The inlet box mounting structure of claim 4, wherein the inlet box comprises a laterally extending portion adapted for first insertion into the hole of the outer panel of the car.

10. The inlet box mounting structure of claim 9, wherein the curved positioning pin is adapted for insertion into the positioning hole after insertion of the laterally extending portion into the hole of the outer panel of the car, such that the inlet box is adapted to rotate along the curved insertion path into the hole in the outer panel of the car.

11. The inlet box mounting structure of claim 10, further comprising an auxiliary positioning pin adapted for insertion into an auxiliary positioning hole provided on the edge of the hole of the outer panel after insertion of the curved positioning pin into the positioning hole.

12. The inlet box mounting structure of claim 11, wherein the curved positioning pin and the auxiliary positioning pin are adapted to position at least one bolt with respect to a corresponding bolt hole for mounting the inlet box to the car.

13. The inlet box mounting structure of claim 1, wherein the inlet box comprises a laterally extending portion that is first inserted into the hole of the outer panel of the car.

14. The inlet box mounting structure of claim 13, wherein the curved positioning pin is inserted into the positioning hole after the laterally extending portion is inserted into the hole of the outer panel of the car, such that the inlet box rotates along the curved insertion path into the hole in the outer panel of the car.

15. The inlet box mounting structure of claim 14, further comprising an auxiliary positioning pin inserted into an auxiliary positioning hole provided on the edge of the hole of the outer panel after insertion of the curved positioning pin into the positioning hole.

16. The inlet box mounting structure of claim 15, wherein the curved positioning pin and the auxiliary positioning pin are adapted to position at least one bolt with respect to a corresponding bolt hole for mounting the inlet box to the car.

* * * * *